United States Patent [19]

Beihoffer

[11] Patent Number: 4,475,287

[45] Date of Patent: Oct. 9, 1984

[54] FILAMENT LINE RETAINING MEMBER

[75] Inventor: Randall A. Beihoffer, Bloomington, Minn.

[73] Assignee: The Toro Company, Minneapolis, Minn.

[21] Appl. No.: 394,232

[22] Filed: Jul. 1, 1982

[51] Int. Cl.³ ............................................. A01D 50/00
[52] U.S. Cl. ........................................ 30/276; 30/347
[58] Field of Search .................... 30/276, 347; 56/12.7

[56] References Cited

U.S. PATENT DOCUMENTS

| 4,091,538 | 5/1978 | Akiyama | 30/276 |
| 4,095,338 | 6/1978 | Naohiko | 30/276 |
| 4,134,204 | 1/1979 | Perdue | 30/276 |
| 4,223,440 | 9/1980 | Inaga | 30/276 |
| 4,236,312 | 12/1980 | Foster et al. | 30/276 |
| 4,244,103 | 1/1981 | Snarr | 30/276 |
| 4,253,238 | 3/1981 | Sheldon | 30/276 |
| 4,269,372 | 5/1981 | Kwater | 242/129.8 |
| 4,271,595 | 6/1981 | Rahe | 30/347 |
| 4,352,243 | 10/1982 | Lombard | 30/276 |

Primary Examiner—Jimmy C. Peters
Attorney, Agent, or Firm—James W. Miller

[57] ABSTRACT

An improved vegetation cutting device (2) comprises a rotatable cutting head (4) having a radially outwardly extending cutting line (14). Cutting line (14) extends through an exit aperture (12) in the cutting head (4) to define a free end portion (16) that serves as the vegetation cutting element. A line retaining member (20) is defined by a crimped tube (22) which distorts the cutting line (14) out of its straight line path as the cutting line (14) extends from the interior of the cutting head (4) to the exit aperture (12). This distortion causes the line (14) to rub against the tube (22) to exert a frictional retaining force sufficiently large to prevent the line (14) from sucking back into the cutting head (4) should it break off at the exit aperture (12).

3 Claims, 2 Drawing Figures

FILAMENT LINE RETAINING MEMBER

TECHNICAL FIELD

This invention relates primarily to a rotatable cutting head having a flexible filament cutting line such as that customarily used in a vegetation trimmer. More particularly, this invention relates to an improved exit aperture and retaining member for the filament cutting line.

DESCRIPTION OF THE PRIOR ART

Vegetation trimmers are known which include a rotatable cutting head having an outwardly extending filament cutting line. When the cutting head is rotated by an appropriate power source, the filament cutting line stiffens sufficiently to sever grass or other ground growing vegetation such as weeds, etc. Typically, a supply of the cutting line is stored on a spool or the like inside the cutting head. An indexing mechanism is provided for feeding more cutting line out from the head as the line becomes shortened during use because of wear or breakage. The cutting head is normally provided with an exit aperture or eyelet through which the cutting line extends as the line passes outwardly from the interior of the cutting head.

A common problem associated with such devices is that the cutting line sometimes extends only a very short distance out past the aperture in the cutting head. Most often this occurs because the cutting line has broken off at the aperture. When the line extends insufficiently far out past the aperture, it has a tendency to "suck in" into the cutting head by actually retracting through the eyelet. Not only does the operator then have to disassemble the cutting head to rethread the line through the aperture, but the suck in often leads to a malfunction known as "bird's nesting" in which the cutting line actually unravels in an explosive manner off of the spool and becomes often irretrievably tangled up. A new spool with a fresh supply of cutting line has to be installed into the cutting head which of course is both disadvantageous and bothersome to the operator.

SUMMARY OF THE INVENTION

This invention relates to an improved exit aperture for the cutting head which aperture prevents "line suck in".

An improved filament line cutting device according to this invention comprises a rotatable cutting head. The cutting head includes a supply of flexible filament cutting line stored therein with a free end portion of the cutting line extending out through an exit aperture in the head. A means for indexing the free end portion of the cutting line outwardly relative to the cutting head is provided. The improvement of this invention comprises a means for exerting a frictional retaining force on the cutting line within the cutting head to prevent the line from sucking back in through the exit aperture should the line break off at the aperture.

BRIEF DESCRIPTION OF THE DRAWINGS

This invention will be described in more detail hereafter, when taken in conjunction with the following drawings, in which like reference numerals refer to like elements throughout.

DETAILED DESCRIPTION

Figure 1:
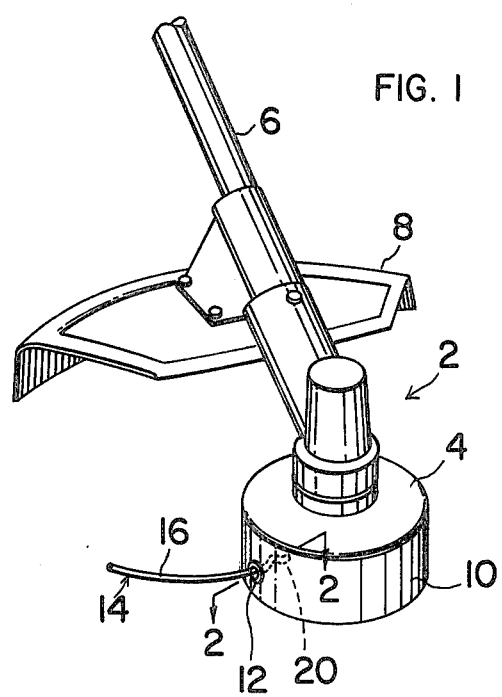
FIG. 1 is a partial perspective view of a vegetation cutting device, particularly illustrating the cutting head of the device.

Referring first to FIG. 1, an improved vegetation cutting device 2 according to this invention comprises a flexible filament line trimmer of any generally conventional design. Such a trimmer normally includes a cutting head 4 rotatably supported at the lower end of an upwardly extending shaft 6. The upper end of shaft 6 supports a power source (not shown), such as an internal combustion engine, with an elongated flexible drive cable connecting the drive shaft of the engine to the cutting head with the drive cable running down through shaft 6. A semicircular or other shaped housing 8 is also mounted on the lower end of shaft 6 and partially surrounds the cutting head 4 to act as a guard for the operator. Housing 8 includes a line cut off blade.

The particular shape and construction of the cutting head 4 is not important to the present invention. It is only necessary that the cutting head 4 have placed in its exterior peripheral wall 10 an exit aperture 12 for a cutting line 14. Cutting line 14 is made of a flexible monofilament material of the type well known in the filament cutting art. Moreover, the cutting line 14 is contained in a coiled fashion on a spool (not shown) or the like rotatably supported in the interior of the cutting head 4. The cutting line 14 extends from the spool out through the exit aperture 12 with a free end portion 16 of the cutting line 14 extending radially outwardly from the cutting head 4. It is this free end portion 16 which stiffens upon rotation of the cutting head 4 to sever grass or other ground growing vegetation. The free end portion 16 is trimmed to an appropriate length when the line is fed outwardly from the cutting head by the line cut off blade carried on housing 8.

Figure 2:
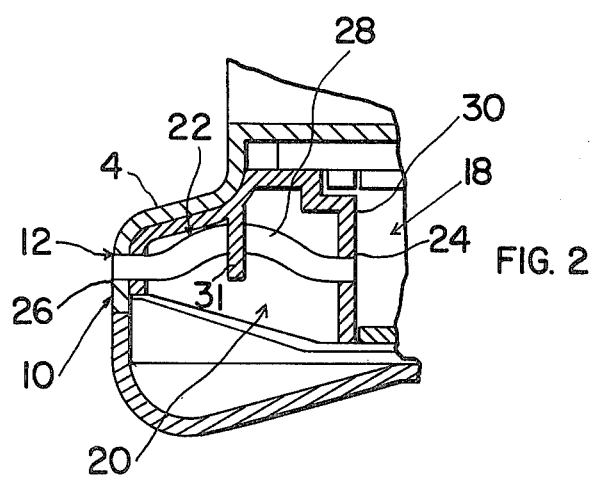
FIG. 2 is a partial cross-sectional view of the cutting head shown in FIG. 1 taken along lines 2—2 in FIG. 1, particularly illustrating the crimped tube that defines the exit aperture and a means for imposing a frictional retaining force on the cutting line.

Any appropriate line indexing mechanism can be used in the interior of the cutting head 4 to feed out upon demand a length of cutting line from the spool to replenish the free end portion 16 as said portion becomes worn through use. Such an indexing mechanism typically comprises some type of ratchet tooth arrangement between the spool and the cutting head which, when actuated by relative axial movement between the spool and the cutting head, will feed out a predetermined discrete increment of line. Any of the indexing mechanisms shown on U.S. Pat. Nos. 4,176,508, 4,134,204 or other issued patents in this art can be used. Moreover, the ground bump indexer of U.S. Ser. No. 714,013, filed Aug. 13, 1976, and assigned to the assignee of this invention can also be used. Both the supply of the cutting line on the spool and the indexing mechanism are contained in the central portion of the interior of the cutting head 4 generally at the location identified as 18 in FIG. 2. From that location the cutting line 14 extends outwardly through exit aperture 12.

This invention relates particularly to a filament line retaining member 20 in the cutting head 4. Retaining member 20 comprises a crimped horizontal tube or passageway 22 having inner and outer ends 24 and 26 and a bend 28 between the ends. Tube 22 is fixed relative to the cutting head. The inner end 24 of tube 22 is fixed in a first support wall 30 inside cutting head 4, the middle portion or bend 28 of tube 22 is fixedly supported in a second support wall 31 and the outer end 26 of tube 22 is fixedly supported in the peripheral wall 10 of cutting head 4. Thus, the outer end 26 of tube 22 defines the exit aperture 12 for cutting line 14. Tube 22 is generally radially aligned in cutting head 4 as shown in FIG. 1. However, tube 22 need not necessarily be along a perfect radial line, but may be offset such that the exit aperture 12 is up to 20° off the radial line.

Tube 22 has a sufficient diameter to allow the cutting line 14 to pass therethrough, but the line during said passage will also be forced to have a crimp or bend corresponding to the bend 28 in tube 22. This distorts the otherwise straight path of line 14 and causes line 14 to rub against the bottom surface of tube 22 as it passes through tube 22 creating a frictional retaining force on the line. The length of tube 22 and the amount of bend 28 is selected to exert a frictional retaining force on the line 14 which is sufficiently strong to prevent the line from sucking back into the cutting head through tube 22 should the line break off at the aperture 2 defined by the outer end 26 of tube 22. The amount of the frictional retaining force needed varies depending upon the speed of rotation of the head and the weight or thickness of the line. A frictional retaining force from 1 to 10 ounces is usually sufficient. This force is not, however, so large as to prevent the line from being indexed outwardly. One example tested by Applicant discloses that a cutting head rotated between 9,000 and 10,000 rpm and having a cutting line of 0.065 inches in diameter will be adequately retained by a frictional retaining force in the range from 2 to 4 ounces.

Crimped tube 22 according to this invention has numerous advantages. The first one is that should the line break off at the exit aperture 12, the frictional retaining force generated by the tube 22 prevents the line from sucking back into the cutting head. All the operator has to do to replenish the line is to simply actuate the indexing mechanism. Thus, there is no need to disassemble the apparatus to attempt to rethread the cutting line through the aperture 12. Moreover, the problem of "bird's nesting" has been substantially reduced since there is now no opportunity for the line to come off the spool inside the housing since the free end of the line is still captured by tube 22 even when it has broken off at aperture 12. Thus, the reliability of the apparatus has been substantially enhanced by tube 22.

Various modifications of this invention will be apparent to those skilled in the art. For one thing, the improved tube 22 of this invention can be used in any filament line cutting device 2, whether said cutting device is part of a hand held vegetation trimmer as shown or a wheel supported lawn mowing device. Moreover, while the crimped tubed is one preferred form for exerting the frictional retaining force on the line, any means for accomplishing the same thing could also be used. Finally, it is preferred that tube 22 be extended all the way out such that its outer end 26 can also perform the dual task of forming the line exit aperture 12. However, this is not strictly necessary. Tube 22 could be inset into cutting head 4 such that its outer end 26 is in the interior of cutting head 4 with a separate line exit aperture 12 still being used. Even in this latter event, tube 22 will impose the necessary frictional retaining force by distorting flexible cutting line 14 out of its straight path as it extends between the indexing means and exit aperture 12. Thus, the scope of this invention is to be limited only by the appended claims.

I claim:

1. An improved filament line cutting device of the type having a rotatable cutting head, a supply of flexible filament cutting line contained in the cutting head with the cutting line extending outwardly from the head in a free end portion through an exit aperture contained in the head, and means for indexing the cutting line outwardly from the supply thereof through the exit aperture to replenish the free end portion of the cutting line, the indexing means being operable while the head is rotating; and wherein the improvement comprises:

crimped tube inside the cutting head through which the line extends, wherein the crimp in the tube is sufficiently large relative to the cutting line to create a frictional retaining force on the cutting line within the cutting head which frictional force is sufficiently large to prevent the line from retracting through the exit aperture into the cutting head should the line break off at the aperture but is sufficiently small to allow a line indexing operation to occur.

2. An improved filament line cutting device as recited in claim 1, wherein the frictional exerting means exerts a frictional force on the cutting line in the range from 1-10 ounces.

3. An improved filament line cutting device as recited in claim 1, wherein the tube has an outer end that defines the exit aperture.

* * * * *